United States Patent
Schonenberg et al.

(10) Patent No.: US 7,556,201 B2
(45) Date of Patent: Jul. 7, 2009

(54) DEVICE FOR READING A BARCODE

(75) Inventors: Cornelis Reinier Johannes Schonenberg, Amersfoort (NL); Laurentius Wilhelmus Nunnink, Amersfoort (NL)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 11/369,455

(22) Filed: Mar. 7, 2006

(65) Prior Publication Data

US 2006/0151609 A1 Jul. 13, 2006

Related U.S. Application Data

(62) Division of application No. 09/787,093, filed as application No. PCT/NL99/00565 on Sep. 10, 1999, now Pat. No. 7,059,529.

(30) Foreign Application Priority Data

Sep. 14, 1998 (NL) .................................... 1010088

(51) Int. Cl.
*G06K 7/10* (2006.01)
(52) U.S. Cl. .............................. 235/462.4; 235/462.32
(58) Field of Classification Search ..................
235/462.01–462.45, 472.01–472.03
See application file for complete search history.

(56) References Cited

U.S. PATENT DOCUMENTS

| | | | |
|---|---|---|---|
| 4,097,729 A * | 6/1978 | Seligman et al. ......... 235/462.4 |
| 4,268,752 A | 5/1981 | Herwig et al. |
| 4,758,731 A | 7/1988 | Schuster |
| 4,766,297 A | 8/1988 | McMillan |
| 4,795,224 A | 1/1989 | Goto |
| 4,816,661 A | 3/1989 | Krichever et al. |
| 4,851,667 A * | 7/1989 | Mergenthaler et al. ...... 250/236 |
| 4,958,894 A | 9/1990 | Khowles |
| 4,962,980 A | 10/1990 | Knowles |
| 5,010,242 A | 4/1991 | Frontino |
| 5,019,714 A | 5/1991 | Knowles |
| 5,115,122 A | 5/1992 | Jwo et al. |
| 5,132,523 A | 7/1992 | Bassett |
| 5,175,421 A | 12/1992 | Harris |
| 5,198,650 A | 3/1993 | Wike, Jr. |
| 5,214,270 A | 5/1993 | Rando |
| 5,276,695 A | 1/1994 | Scheps |
| 5,306,900 A | 4/1994 | Metlitsky et al. |

(Continued)

FOREIGN PATENT DOCUMENTS

GB 2345370 A 5/2000

(Continued)

*Primary Examiner*—Thien M Le
(74) *Attorney, Agent, or Firm*—The Webb Law Firm

(57) ABSTRACT

A device for scanning and/or recognizing one or more barcodes includes a laser light source for transmitting laser light; a rotatable polygonal mirror for reflecting the transmitted laser light; a number of fixedly disposed flat mirrors for reflecting laser light; a pick-up element for picking up laser light scattered by a barcode; a compact housing in which the laser light source, the polygonal mirror, the flat mirrors and the pick-up element are arranged, which compact housing is constructed from a substantially flat bottom side, a top side and standing walls arranged therebetween and wherein the distance between the standing walls ranges between 1.2-5.5 inches (3-14 cm).

15 Claims, 5 Drawing Sheets

U.S. PATENT DOCUMENTS

| | | |
|---|---|---|
| 5,307,358 A | 4/1994 | Scheps |
| 5,314,631 A | 5/1994 | Katoh et al. |
| 5,448,050 A | 9/1995 | Kostizak |
| 5,504,316 A | 4/1996 | Bridgelall et al. |
| 5,602,376 A | 2/1997 | Coleman et al. |
| 5,629,510 A | 5/1997 | Quinn |
| 5,637,852 A * | 6/1997 | Knowles et al. ........ 235/462.14 |
| 5,691,528 A | 11/1997 | Wyatt et al. |
| 5,693,930 A | 12/1997 | Katoh et al. |
| 5,705,799 A | 1/1998 | Li |
| 5,859,417 A | 1/1999 | Dvorkis et al. |
| 5,861,615 A | 1/1999 | Bridgelall et al. |
| 5,962,838 A | 10/1999 | Tamburrini |
| 5,979,770 A | 11/1999 | Schlieffers et al. |
| 5,992,747 A | 11/1999 | Katoh et al. |
| 6,036,094 A | 3/2000 | Goldman et al. |
| 6,043,503 A | 3/2000 | Dow et al. |
| 6,053,413 A | 4/2000 | Swift et al. |
| 6,059,188 A | 5/2000 | DiFazio et al. |
| 6,065,676 A | 5/2000 | Ring et al. |
| 6,105,871 A | 8/2000 | Campo et al. |
| 6,216,953 B1 | 4/2001 | Kumagai et al. |
| 6,216,983 B1 | 4/2001 | Wehner et al. |
| 6,382,513 B1 | 5/2002 | Dvorkis et al. |
| 6,435,413 B1 | 8/2002 | Kumagai et al. |
| 6,575,368 B1 | 6/2003 | Tamburrini et al. |

FOREIGN PATENT DOCUMENTS

| | | |
|---|---|---|
| JP | 57198804 A | 12/1982 |
| WO | WO 9728512 | 8/1997 |

* cited by examiner

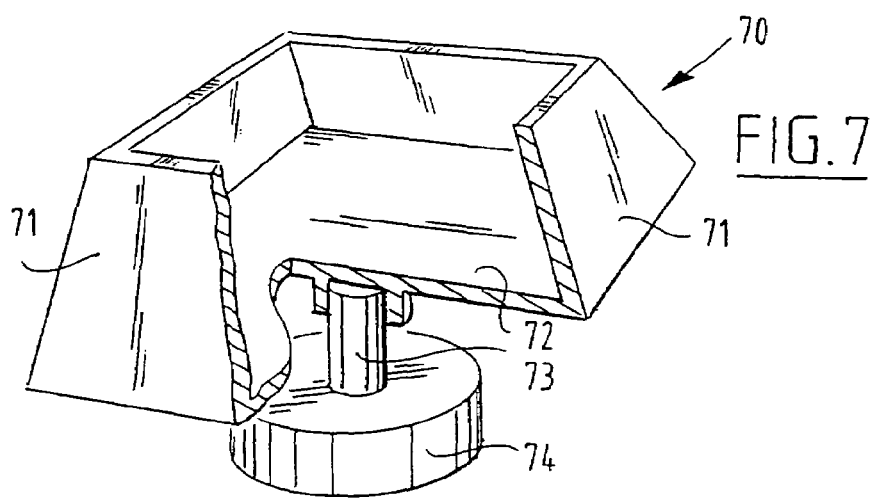
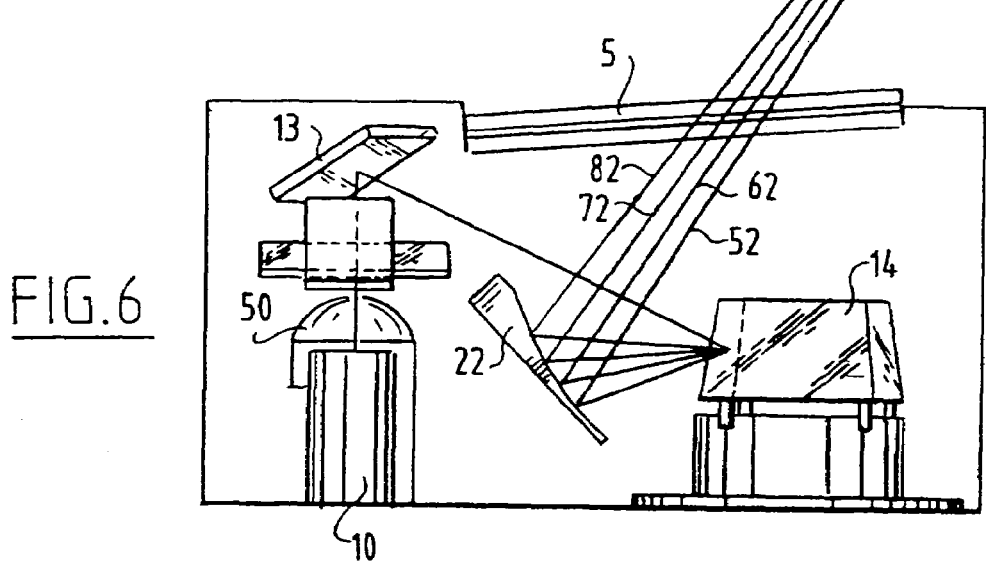
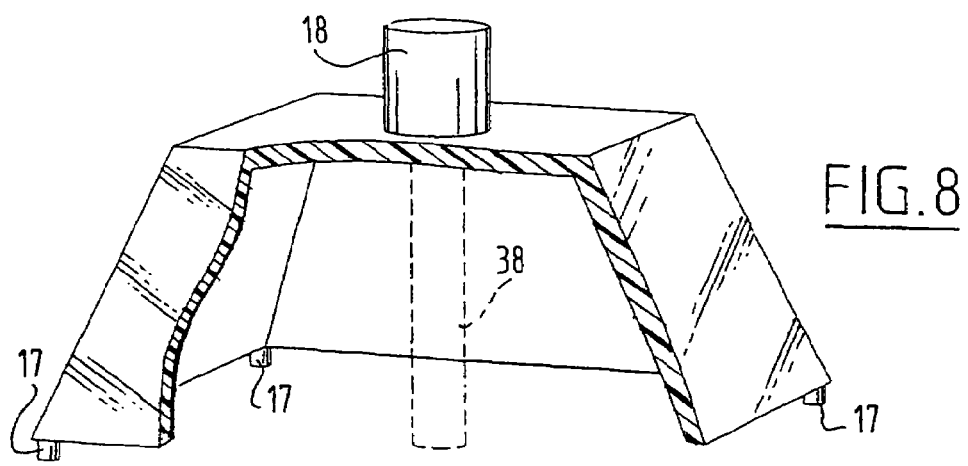

DEVICE FOR READING A BARCODE

CROSS REFERENCE TO RELATED APPLICATION

This application is a division of U.S. patent application Ser. No. 09/787,093, filed Jun. 12, 2001, which is the United States national phase of International Application No. PCT/NL99/00565, filed Sep. 10, 1999, which designated, inter alia, the United States, and which claimed the priority benefit of Netherlands Patent Application No. 1010088, filed Sep. 14, 1998.

BACKGROUND OF THE INVENTION

1. Field of the Invention

The present invention relates to a device and method for reading barcodes on objects, such as for instance articles in a shop.

2. Description of the Related Art

Such devices or scanners can be divided into two types. The first type is a so-called fixed scanner which is disposed at a fixed location, for instance in or on a counter of a shop, wherein the objects for scanning are moved by hand along the front of the scanner by an individual. These fixed scanners are used particularly for small objects which can be readily picked up and moved over the scanner by an individual. A second type is a hand scanner which is carried in the hand of the individual or operator in the direction of the barcode on the relevant article, whereafter the barcode is read. These hand scanners are used particularly in the case of large or heavy objects which are awkward if not impossible to pick up by hand and move along the front of the scanner.

In many cases, such as for instance in the case of DIY shops where not only small objects such as nails and the like but also large and heavy objects such as doors and the like have to be scanned, scanners of both types are required.

Scanners are known which combine these two types in one apparatus. When functioning as fixed scanners, however, these scanners must be placed in separate holders, which entails drawbacks in respect of utility and ease of operation. These known scanners moreover have such large dimensions that they cannot easily be grasped in one hand without additional measures, which makes them difficult to use as hand scanner.

An object of the present invention is to obviate the above stated drawbacks.

BRIEF SUMMARY OF THE INVENTION

The present invention therefore provides a device for scanning and/or recognizing one or more barcodes, comprising:
  a laser light source for transmitting laser light;
  a rotatable polygonal mirror for reflecting the transmitted laser light;
  a number of fixedly disposed flat mirrors for reflecting laser light;
  a pick-up element for picking up laser light scattered by a barcode; and
  a compact housing in which the laser light source, the polygonal mirror, the flat mirrors and the pick-up element are arranged, which compact housing is constructed from a substantially flat bottom side, a top side and standing walls arranged therebetween and wherein the distance between the standing walls amounts to 1.2-5.5 inches (3-14 cm).

By providing the housing with a flat underside it can be placed in simple manner during use as a fixed scanner at a random position on a counter by an operator without a holder or the like being required. The housing moreover has such small dimensions in the longitudinal direction that it can be grasped easily with one hand to simplify use of the scanner as hand scanner.

When used as fixed scanner the device operates in the manner of a so-called omnidirectional scanner, i.e. scan lines are written at various angles in order to make the chance of recognition of a barcode moved along the scanner as large as possible at all angles. During use as hand scanner however, the device often operates preferably in a unidirectional scanning mode, i.e. scan lines are written running substantially in one direction for scanning the barcode in one direction. This increases the selectivity in recognition of barcodes, since substantially only one barcode running parallel to the scanning direction is recognized, while unintentional recognition of other barcodes is avoided. This increased selectivity is particularly important in the case where barcodes placed at a short mutual distance must be recognized. In some cases the omnidirectional scanning mode is however still preferred during the use as hand scanner.

For an omnidirectional scanning mode as many scan lines as possible must be written at as many angles as possible, so that all fixedly disposed flat mirrors are used to reflect the laser light coming from the polygonal mirror. In the unidirectional scanning mode laser light has only to be reflected by one of the flat mirrors, so that scan lines are written substantially in one direction. When the rotatable polygonal mirror is positioned such that laser light reflected thereby would fall onto another fixedly disposed flat mirror, the laser light source must therefore be switched off. The laser light source will therefore have to be switched off and on depending on the position of the rotatable polygonal mirror during the rotation. According to a preferred embodiment of the invention the device therefore comprises:
  position determining means arranged in the housing for determining the position of the rotatable polygonal mirror; and
  control means which are connected to the position determining means and the laser light source and which switch the laser light source on or off depending on the position of the rotatable polygonal mirror.
The position determining means preferably comprise:
  sensor means which detect laser light reflected from the polygonal mirror; and
  rotation speed determining means which determine the rotation speed of the rotatable polygonal mirror.

By detecting laser light reflected from the polygonal mirror using sensors and by also determining the rotation speed of the rotatable polygonal mirror at that moment, the position of the polygonal mirror can be determined in simple and precise manner, this being necessary for switching the laser light source on and off.

In a preferred embodiment of the invention the device also comprises a mirror arranged in the housing and foldable between two positions, in the first position of which a first mirror surface reflects the laser light incident thereon and in the second position of which a second mirror surface reflects the laser light incident thereon. The first mirror surface preferably has a substantially flat surface and the second mirror surface preferably has a surface which is substantially concave in one direction. This has the advantage that in an omnidirectional scanning mode a mirror surface suitable for this purpose, preferably a flat surface, reflects the laser light, while in the unidirectional scanning mode another surface suitable for this scanning mode reflects the laser light, i.e. in this case a concave surface. Due to the concave surface in the second position of the foldable mirror the beams of laser light coming from the different surfaces of the rotatable polygonal mirror are converged to form a beam with an average intensity which is a maximum of four times greater. A sharp scan line of high intensity hereby results, which improves the operation of the device as hand scanner. An additional advantage is that such a scan line can be more easily discerned visually by an individual operating the scanner.

According to a preferred embodiment of the invention the device also comprises:

folding means arranged in the housing which are connected to the foldable mirror and fold it between the two positions;

operating means arranged partially inside and partially outside the housing which are connected to the folding means. The folding means and operating means provide in this preferred embodiment a simple switching between the first and second position of the foldable mirror and therefore between the omnidirectional and unidirectional scanning mode of the scanner. This has the further advantage that an operator can operate the operating means for switch-over between the omnidirectional and unidirectional scanning mode in simple manner, for instance by pressing with a finger on the operating means protruding outside the housing.

The operating means are preferably arranged on the underside of the housing so as to ensure that when the housing is set down with the underside thereof the omnidirectional scanning mode is chosen or when the housing is picked up the unidirectional scanning mode is chosen.

In a further preferred embodiment of the invention the folding means comprise an electric motor and the operating means a switch for switching the electric motor on and off.

According to a further preferred embodiment the operating means comprise an operating member protruding partially through a guide opening into the housing, wherein the operating member can be guided into the housing whereby the folding means carry the foldable mirror into the first position and wherein the operating member can be guided partially out of the housing by spring means arranged in the housing, whereby the folding means carry the foldable mirror into the second position. This has the advantage that when the housing is set down and picked up the foldable mirror is folded between the first and second position, respectively corresponding with the omnidirectional scanning mode and the unidirectional scanning mode, in wholly mechanical manner and without an operator him/herself having to take any action.

According to a further preferred embodiment of the invention the operating member is provided with locking means for locking the operating member with the foldable mirror in the first position. This has the advantage that when the housing is picked up and the scanner therefore serves as hand scanner, the operating member can nevertheless be fixed in a position such that the scanner operates in the omnidirectional scanning mode. In such a case an operator does not have to keep his finger pressed continuously on the operating member.

According to a further embodiment of the invention the rotatable polygonal mirror comprises a central part and mirror surfaces standing from a first side thereof and the mirror is provided on the other side with receiving means which receive a drive shaft for rotating driving of the rotatable polygonal mirror. This embodiment obviates the drawback which occurs during manufacture of known polygonal mirrors, wherein due to the presence of a relatively large number of small parts for receiving the drive shaft there occurs too little discharge of heat during the manufacturing process and the mirror surfaces of the polygonal mirror are therefore deformed.

According to another aspect of the invention a device is provided for scanning and/or recognizing one or more barcodes, which comprises a housing in which are arranged:

a laser light source for transmitting laser light;

a rotatable polygonal mirror for reflecting the transmitted laser light;

a number of fixedly disposed flat mirrors for reflecting laser light;

a pick-up element for picking up laser light scattered by a barcode; and drive means for driving a rotating support member, wherein the polygonal mirror is placed with the outer ends thereof on the rotating support member.

By placing the polygonal mirror with its ends on a rotating support member a drive shaft as used in the known scanning devices can be dispensed with, which not only simplifies the construction of the polygonal mirror but also provides a weight advantage, whereby a lighter drive motor can be used. Higher rotation speeds are moreover possible with such a polygonal mirror, which increases the number of scan lines written per time unit and therefore the chance of recognition of a barcode. In addition, such a lighter motor uses less energy. Also obviated is the drawback which occurs during manufacture of the known polygonal mirrors, wherein due to the presence of a relatively large number of small parts for receiving the drive shaft there occurs too little discharge of heat during the manufacturing process and the mirror surfaces of the polygonal mirror are therefore deformed to some extent. Owing to the simplified construction of the polygonal mirror heat can be discharged more effectively during the manufacture thereof, whereby the mirror surfaces display a greater flatness relative to the mirror surfaces of the known polygonal mirrors.

According to a further preferred embodiment of the invention the ends of the polygonal mirror are fixed at least partially to the rotating support member, wherein double-sided tape provided with adhesive means is preferably arranged between the ends of the polygonal mirror and the rotating support member. The polygonal mirror can hereby be fixed in simple manner to the rotating support member.

According to a preferred embodiment of the invention the ends of the polygonal mirror are provided with centering pins which engage round or in the rotating support member and which centre the polygonal mirror relative to drive means. By centering the polygonal mirror with said centering pins a separate balancing step is no longer required during assembly of the scanner.

According to a further preferred embodiment of the invention a protruding gripping component is fixed to the polygonal mirror, so that the mirror can be arranged on the support member and removed from the support member in simple manner and without contacting the mirror surfaces thereof, which would reduce the quality thereof.

According to a further preferred embodiment of the invention the height-width ratio of the polygonal mirror has a value of about 1 or higher. Known polygonal mirrors have a width which is greater than their height. However, by giving the mirror surfaces a height which is greater than their width the air resistance of the polygonal mirror can be reduced during rotation and the adjustment in height direction of the laser light source is less critical so that the positioning thereof need only be adjusted in width direction.

According to a further preferred embodiment of the invention a laser light source adjusting member is fixed to the laser light source, which positions the laser light source in only the width direction.

According to a further preferred embodiment of the invention the rotatable polygonal mirror is arranged in the vicinity of a first corner of the housing and the fixedly disposed flat mirrors and/or the foldable mirror are arranged in the vicinity of an opposite corner of the housing. Such an asymmetrical arrangement of the polygonal mirror on the one side and the fixed mirrors and/or the foldable mirror on the other results in a space-saving inside the housing of the device such that it can take an even narrower form.

BRIEF DESCRIPTION OF THE DRAWINGS

Further details, advantages and features of the present invention will be elucidated in the following description and with reference to the annexed figures, in which:

FIG. 6 is a schematic view of a preferred embodiment of a scanner with the mirror folded shut;

FIG. 7 shows a perspective view of an alternative embodiment of the rotatable polygonal mirror; and FIG. 8 shows a cross section of the polygon of FIGS. 3, 4 and 5.

DESCRIPTION OF THE PREFERRED EMBODIMENT(S)

Figure 1:
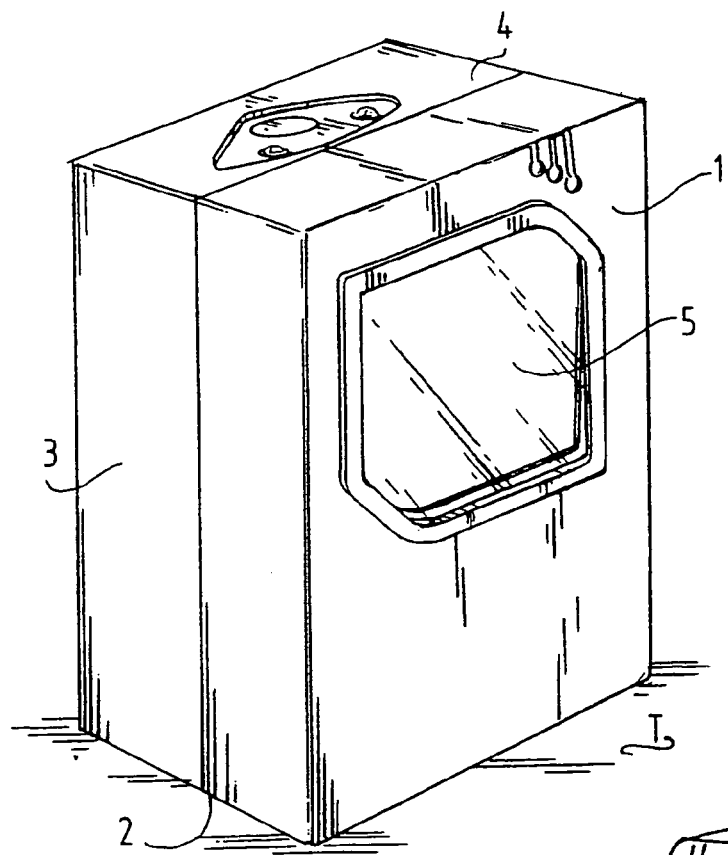
FIG. 1 shows a view of a preferred embodiment of the scanner according to the present invention.

The scanner of FIGS. 1-6 comprises a housing provided with a flat bottom 2, a standing front wall 1, a standing rear wall 8, two standing side walls 3 and a top wall 4. Arranged in front wall 1 is a window 5 through which laser light exits and enters. In FIG. 1 the scanner is set down with its flat bottom 2 on a counter or table T of a shop and in this position the scanner functions as so-called fixed scanner, wherein the barcodes of the articles for recognizing are moved past window 5 by an operator (not shown). A beam of laser light herein exits through window 5. The laser light scattered by a barcode on an article subsequently re-enters the scanner via window 5 and is received there by a receiver 49 via a collector lens 50 and then processed, wherein the read barcode is decoded.

Figure 2:
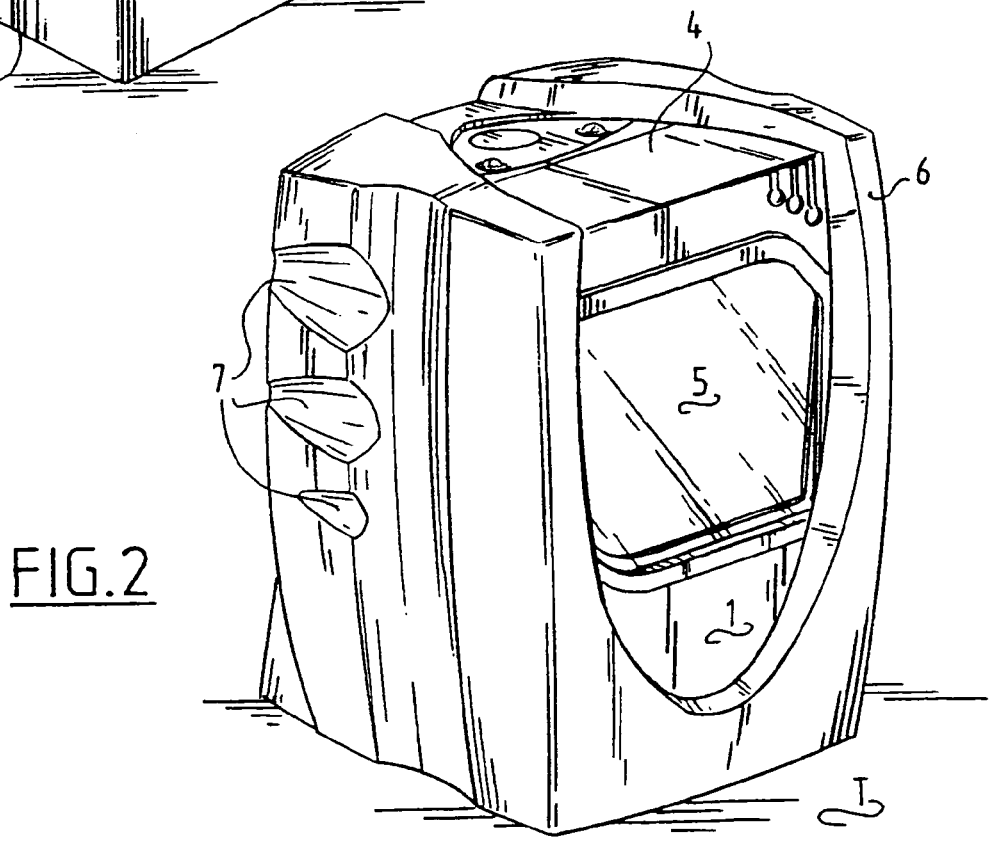
FIG. 2 shows a view of a preferred embodiment of the scanner of FIG. 1, which is provided with a protective holder.

The scanner according to FIG. 1 is shown in FIG. 2, wherein however it is provided on the outside of the housing 1, 2, 3, 4, 8 with a protective or resilient holder 6, preferably manufactured from a resilient material such as for instance an elastic plastic, rubber or the like. In addition to having a protective function, this holder also has the function of facilitating gripping of the holder with a hand of an operator. Provided for this purpose in holder 6 are a number of grooves 7 in which the fingers of the hand can rest.

Figure 3:
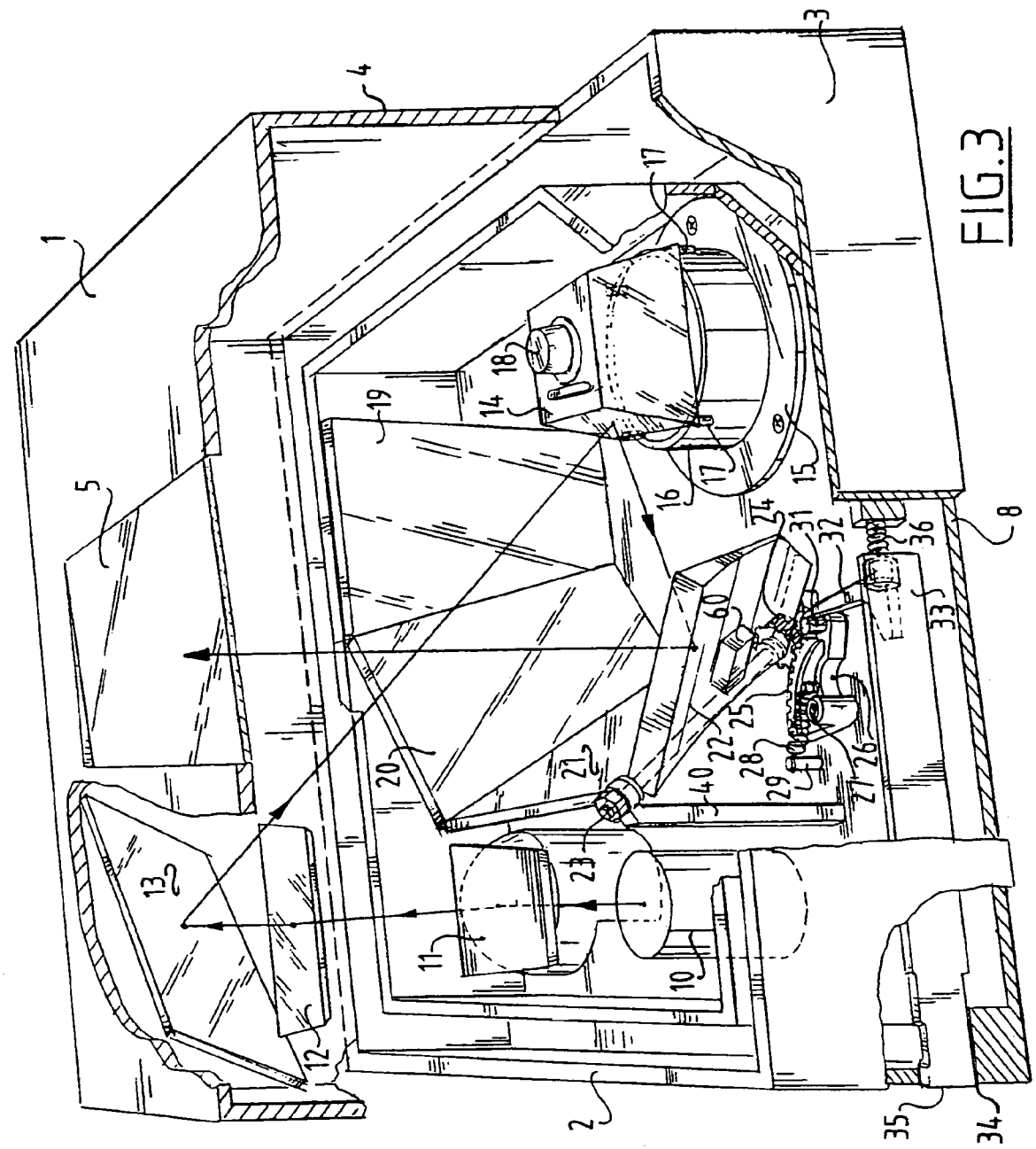
FIG. 3 is a partly cut-away perspective view of a preferred embodiment of the scanner with the mirror folded open.

FIG. 3 shows a cut-away view of the scanner. A laser light source 10 transmits a beam of laser light or laser beam (indicated with an arrow) which subsequently falls via an adjustable mirror 11 and a mirror 13 onto a rotating polygonal mirror or polygon 14. Polygon 14 is constructed in this embodiment from four specular surfaces which are each directed at a different angle relative to the rotation axis and define a lateral surface which is closed around an axis of rotation of the polygon 14. Polygons with fewer or more surfaces are however also possible. Laser light beams which are incident upon the mirror surfaces of polygon 14 are therefore reflected in different ways depending on the angle between the relevant mirror surface and the vertical.

Polygon 14 is arranged on and non-integrally affixed to a rotating disc 16 which is rotated by a drive motor 15. This motor causes polygon 14 to rotate at a determined rotation speed, wherein the rotation speed lies in the range of 10 to 10,000 revolutions per minute, such as for instance 3,000 revolutions per minute. The laser light reflected from a random mirror surface of polygon 14 is directed toward one of the mirrors 19-22, depending on the positioning of the polygon. Mirrors 19, 20 and 21 are flat mirrors disposed in stationary operative positions wherein all of the mirrors 19, 20 and 21 are aligned side by side along a single substantially circumferential direction or arranged fixedly in the housing of the scanner. In the position of FIG. 3, mirror 22 is likewise directed with a flat side toward the polygon and will therefore function similarly to any of the mirrors 19, 20 or 21. After reflection against a mirror (19-22) the light beam exits from the transparent window 5 of the scanner in the direction of a possible article for scanning.

Figure 4:
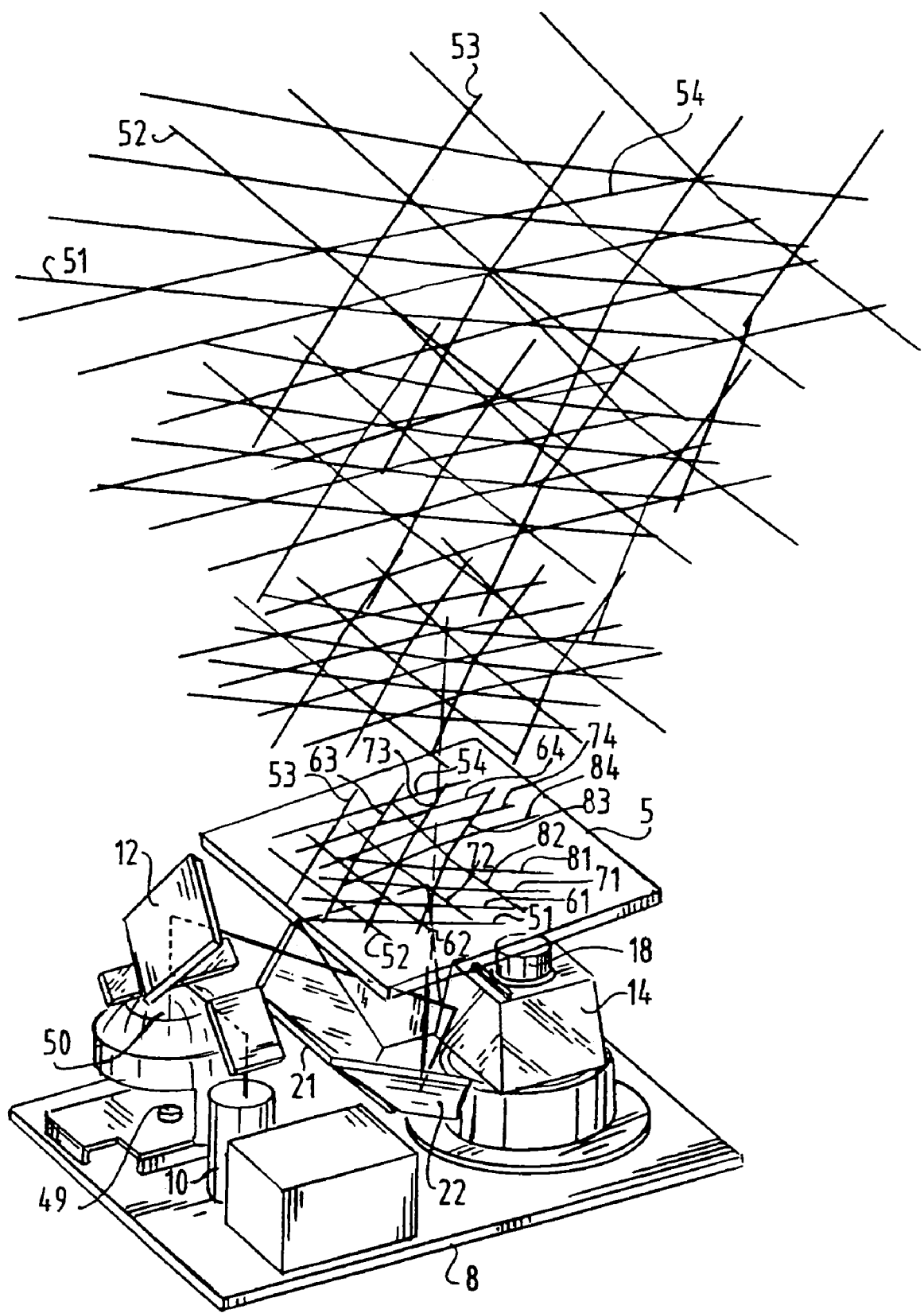
FIG. 4 shows in schematic manner a scanner with the associated pattern of scan lines.

FIG. 4 shows the scan pattern on the window 5 and at three different distances from window 5. When polygon 14 rotates in clockwise direction, the laser light from a first mirror surface of the polygon will first impinge on the flat side of mirror 22 whereby a scan line 51 is written. The laser beam then impinges on mirror 21 whereby line 52 is written. As the polygon is further rotated, scan lines 53 and 54 are then written via mirrors 20 and 19. The laser light beam coming from the laser beam source is subsequently reflected by a following mirror surface of polygon 14, which mirror surface in this case lies at a greater angle relative to the vertical. Scan lines 61, 62, 63 and 64 are hereby written by respective mirrors 22, 21, 20 and 19 and scan lines 71-74 and 81-84 are written in the case of the subsequent mirror surfaces of the polygon. In the shown embodiment with four mirrors 19-22 and four mirror surfaces of polygon 14 a total of 4×4=16 scan lines are therefore written. The pattern of scan lines is such that the scanner will recognize a passing barcode in as many directions as possible (omnidirectional scan line pattern).

During use as hand scanner, such an omnidirectional scanning mode is however not desirable. The scanner is in this case carried manually by the operator to the barcode on the object for scanning and aligned relative thereto. When for instance the scanner is aligned such that a barcode for recognizing is positioned in front of window 5 in the width direction of the scanner, only scan lines 52, 62, 72 and 82 are required for recognition of the barcode. The other scan lines are in this case superfluous and can even result in erroneous decoding of the barcodes, particularly in the case that barcodes are situated at a short mutual distance. The barcodes are situated at a short mutual distance when barcodes are for instance arranged on the spines of a stack of books. When the scanner is moved in the direction of the stack of books, it is in some cases not possible for the operator to find out which of the books has been scanned due to the spatial distribution of the scan lines.

For a unidirectional scanning mode, only the scan lines 52, 62, 72 and 82 have to be written in this embodiment which occur as a result of reflection against a mirror surface at the location of mirror 21. When the polygon is directed such that the laser beam would fall onto the other mirrors 19, 20 or 22, no scan line should be written and the laser light source must therefore be switched off. For this purpose a sensor 60 is arranged in an opening in mirror 22 which detects the passage of a laser beam and the point in time at which this occurs. It is not only possible hereby to determine the rotation speed of the polygon but, in co-action with sensor 60, it is also possible to determine the exact position of polygon 14 at all times. Depending on the position of polygon 14, control electronics (not shown) switch laser light source 10 on or off.

Figure 5:
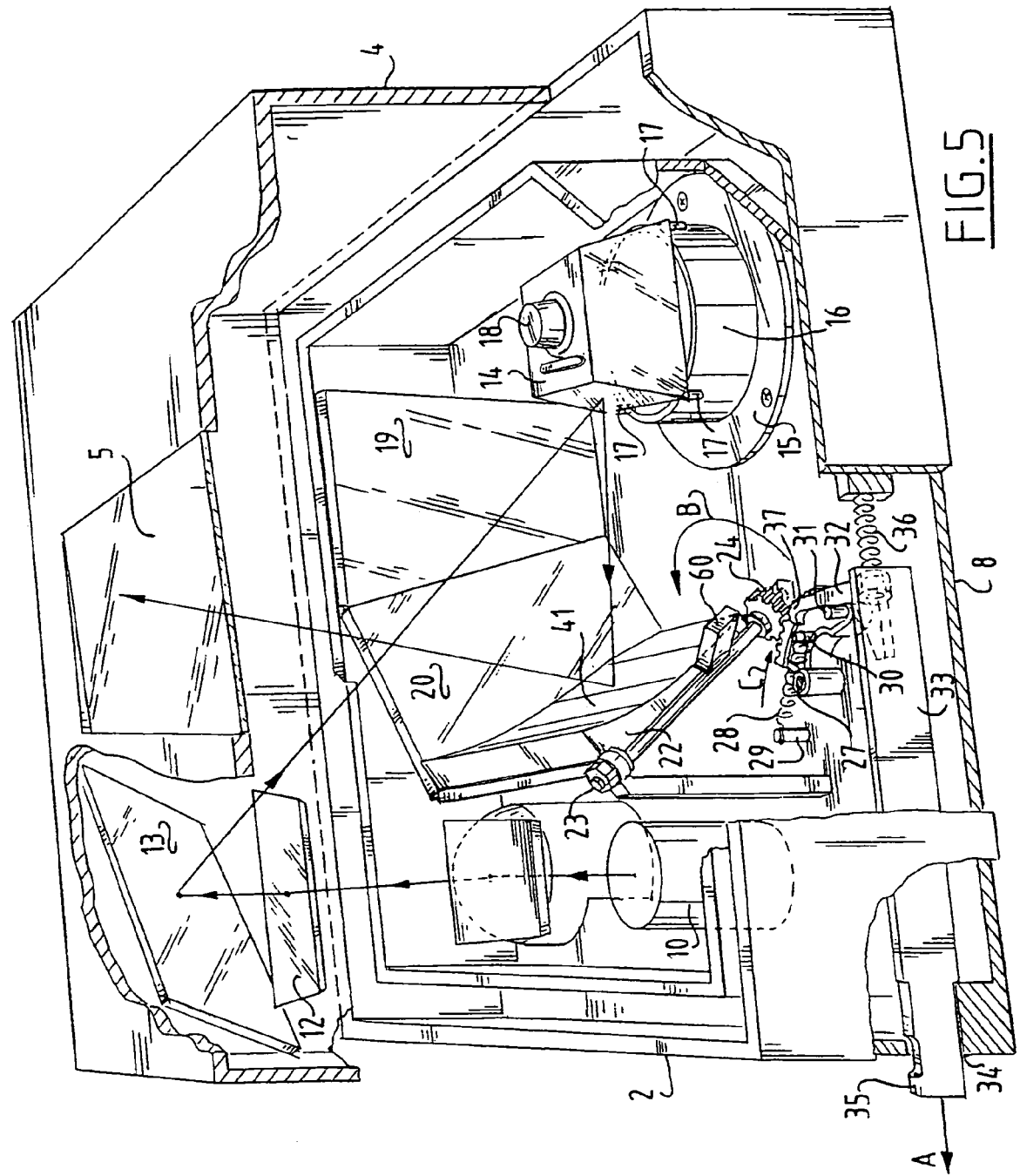
FIG. 5 is a partly cut-away perspective view of a preferred embodiment of the scanner with folded mirror.

In order to further limit the spatial distribution of the remaining scan lines 52, 62, 72 and 82 the mirror 22 is embodied for folding between two stationary operative positions. FIG. 3 shows the folded-open position in which the mirror surface directed toward polygon 14 is substantially flat. FIG. 5 shows the folded-over position wherein mirror 22 is rotated around a shaft 23 which is fixed in an upright 40 and to the bottom 8 of the scanner. As alternative to upright 40, an injection molded component can be provided in corresponding manner on rear wall 8. The concave second surface 41 on the rear of foldable mirror 22 is in this situation directed toward polygon 14 instead of the flat first mirror surface of mirror 21.

FIG. 6 shows how the laser beams run when they impinge upon the concave surface of mirror 22. This shows that a laser beam 52, 62, 72 and 82 is transmitted four times in succession, corresponding with the number of mirror surfaces of polygon 14, wherein laser beams 52, 62, 72 and 82 are focused such that at some distance above the window of scanner 4 they form scan lines substantially falling one over another. Instead of four parallel lines written at a distance from each other, four parallel lines are in this case written falling one over another, whereby taken on average through time a line having a four times greater intensity is written. A line is therefore written four times more often, which increases the chance of striking and recognizing a barcode. An additional advantage is that such a scan line can be more easily discerned visually by an individual operating the scanner.

Folding of mirror 22 takes place in the following manner. In the position of the scanner shown in FIG. 1, i.e., generally the omnidirectional position, the scanner is placed with the bottom 2 of the housing on the checkout T. The outer end 35 of an operating component 33, which is guidable in a guide opening 34 in the bottom 2 of the housing, is hereby pressed in so far counter to the pressure of a pressure spring 36 fixed to operating component 33 and a side wall 3 of the housing that the outer end 35 is situated in one line with the underside of bottom 2. Mounted on operating component 33 is an arm 32 which has a hook shape 37 on its opposite end. The hook shape 37 engages onto a pin 31 of a coupling piece 26, which coupling piece 26 is rotatable around a shaft 27 arranged on the rear side 8 of the housing. Coupling piece 26 is pulled by a draw spring 28 which is attached on one side to a fixing pin 29 mounted on the rear side 8 of the housing and which is fixed on the other side to a fixing pin 30 connected to coupling piece 26. The draw spring serves to rotate coupling piece 26 until it is caught behind hook shape 37 of arm 32. Via a gear rack 25 mounted on coupling piece 26 and a toothed wheel 24 mounted on said shaft 23, this rotation movement is converted into a rotation movement of shaft 23, whereby the foldable mirror 22 fixed to shaft 23 is urged into its folded-open position.

If the scanner is picked up so as to function as hand scanner and the unidirectional scanning mode is therefore preferred in most cases, pressure spring 36 urges the operating components 33 outward, since counterpressure from the table top or counter T is now no longer exerted on the outer end 35 of operating part 33. As a result of this movement (arrow A) coupling piece 26 is rotated in the direction of arrow C counter to the force of draw spring 28, which movement is transmitted via gear rack 25 and toothed wheel 24 as a rotation movement of foldable mirror 22 in the direction of arrow B, whereby mirror 22 is carried into the folded-over position.

If the scanner is picked up so as to function as hand scanner and the omnidirectional scanning mode is however preferred, for instance for scanning a barcode without another barcode being present in the vicinity, an operator can press operating component 33 into the housing again with a finger, thus bringing about an omnidirectional scanning mode. A locking member or locking slide (not shown) is preferably provided on the housing with which operating component 33 can be temporarily locked in such a case.

In this construction the switch-over between the use of the scanner as fixed scanner and the use of the scanner as hand scanner is effected in simple mechanical manner, wherein the user or operator does not have to perform any additional operations other than picking up the scanner or setting the scanner down on its bottom.

According to another aspect of the preferred embodiment of the invention, the polygon 14 is placed directly onto a rotating disc 16 of drive motor 15, whereby a drive shaft can be dispensed with. Because a drive shaft is no longer required, polygon 14 can take a very simple form, wherein small components and the like, which were previously necessary for receiving the drive shaft, can possibly be avoided. Small components have the drawback during the manufacturing process of the polygon that they prevent the discharge of heat, which can result in great deformations. These deformations are serious since in such a case the mirrors are no longer wholly flat, which adversely affects the scanning performance of the scanner. Flatter mirrors can therefore be manufactured by embodying the polygon in simple manner and without small components. The absence of a drive shaft moreover means a weight reduction, whereby a lighter motor can suffice which is moreover suitable for a higher rotation speed. This latter implies that a larger number of scan lines can be written per time unit.

The outer ends of polygon 14 are preferably provided with centering pins 17 which engage in or round the rotating disc 16 and thereby centre polygon 14 relative to this disc 16. This means that a separate balancing step, such as was required in the case of a shaft-driven polygon, can be omitted.

A double-sided adhesive tape or band (not shown) is preferably arranged on the top of rotating disc 16. By simply placing the ends of polygon 14 on the top side of this tape, a sufficiently sturdy connection between rotating disc 16 and polygon 14 is brought about.

Since the mirror surfaces of polygon 14 must remain clean in order to retain the reflective properties thereof, a protruding pick-up part 18 is arranged on the top of the polygon. Polygon 14 can be picked up easily herewith without this resulting in fingermarks on the sensitive mirror surfaces of polygon 14.

In order to obviate the above stated drawback of the limited heat discharge in the case of small components in the polygon and the deformations of the mirror surfaces caused thereby, another embodiment of polygon 70 is shown in FIG. 7, wherein mirror surfaces 71 extend upward from a central platform 72. Polygon 70 is driven by a drive shaft 73 which engages on the central platform 72 on the outside thereof. Drive shaft 73 is driven by a motor 74.

The height of polygon 14, 70 is embodied such that it is greater than the width of the polygon (i.e., a height-width ratio equal to or greater than 1). This not only reduces the air resistance of the rotating polygon 14, but also makes the adjustment of the laser light source in height direction less critical. Special measures for such an adjustment can therefore be dispensed with. Only adjustment in width direction remains necessary. Such an adjustment is brought about by an adjusting shaft (not shown) arranged obliquely at an angle of about 45 degrees such that laser light source 10 is adjusted in width direction by operating a screw running in height direction and engaging on the adjusting shaft.

FIG. 8 shows a cross-section of the polygon 14 already shown in FIGS. 3, 4 and 5. Also avoided in the shown embodiment of the polygon are small components which limit the heat discharge during the manufacturing process of the polygon and thereby cause deformations of mirror surfaces. On the top of the polygon 14 a thickened portion 18 is provided to enable grasping of polygon 14 in simple manner without touching the mirror surfaces herein. Indicated with broken lines in the figure is that in another embodiment the polygon 14 is driven directly via a long shaft 38. By also retaining in this embodiment the centering pins 17 for aligning polygon 14, less stringent structural requirements are made for the receiving of drive shaft 38 in polygon 14 compared with an embodiment in which only a drive shaft is provided and centering pins 17 are omitted. As a result it is possible to suffice with fewer small components in polygon 14, which further improves heat discharge during the production of the polygon, and the polygon can still be centered in simple manner.

The placing of polygon 14 and mirrors 19-21 is such that the narrowest possible scanner is provided, i.e., that the distance between side walls 3 of the housing of the scanner is as small as possible, preferably between 1.2 and 5.5 inches (3 and 14 cm), so that an operator can readily take hold of the scanner with one hand. For this purpose polygon 14 is placed as closely as possible to a corner of the housing, while mirrors 19-21 are placed as closely as possible to an opposite corner of the housing. With this placing of the polygon and the mirrors the housing can be embodied very compactly, wherein the internal path length of the laser light is still maintained. A width of 2.4 inches (60 mm) by a depth of 2.0 inches (50 mm) and a height of 3.3 inches (85 mm) can be realized for a scanner of the above-described type.

Although the advantages of the above stated placing of polygon 14 and fixed mirrors 19-21 will be apparent to a person skilled in the relevant field, a further elucidation follows below. In known scanners the placing of the polygon and the fixed mirrors is embodied such that an axis of symmetry, which is defined as a line extending on one side through the centre of the polygon and on the other through the centre of the fixed mirrors, extends in longitudinal direction of the housing of the scanner. More specifically, this means that the polygon is placed centrally as seen in transverse direction and in the vicinity of an end surface of the housing as seen in longitudinal direction, while the fixed mirrors are placed symmetrically relative to said axis of symmetry at a distance from the polygon. It may therefore occur that scan lines reflected from different fixed mirrors have essentially the same direction. When for instance two fixed mirrors are placed on either side of the polygon, wherein both fixed mirrors are oriented in the longitudinal direction of the housing, there are in fact two vertical scan lines produced, which is not strictly necessary at a sufficiently high rotation speed of the polygon. Because one or more fixed mirrors are redundant, they can be omitted without adversely affecting the omnidirectional scanning pattern and the scanning performance. The omission of one or more fixed mirrors simplifies the design of the scanner. The omission of one or more redundant mirrors, for instance the omission of one of the two fixed mirrors oriented in the longitudinal direction, moreover reduces the space required in the housing for placing of the fixed mirrors. In such a case the axis of symmetry of the polygon in the fixed mirrors no longer extend in longitudinal direction of the housing of the scanner. An omnidirectional scanning pattern can also be maintained in the case of such an "oblique" axis of symmetry, while a housing is provided with a width which is minimal.

The present invention is not limited to the above-described preferred embodiments thereof, the rights sought are defined by the following claims, within the scope of which many modifications can be envisaged.

The invention claimed is:

1. A device for scanning and/or recognizing one or more barcodes, which comprises a housing in which are arranged:
   a laser light source for transmitting laser light;
   a rotatable polygonal mirror comprising a plurality of flat mirror surfaces defining a lateral surface which is closed around an axis of rotation of said polygonal mirror, for reflecting the transmitted laser light impinging thereon;
   a number of fixedly disposed mirrors for reflecting laser light;
   a pick-up element for picking up laser light scattered by a barcode; and
   drive means for driving a rotating support member;
   wherein the polygonal mirror is placed with outer ends thereof directly on the rotating support member.

2. The device as claimed in claim 1, wherein the ends of the polygonal mirror are fixed at least partially to the rotating support member.

3. The device as claimed in claim 1, wherein double-sided tape provided with adhesive means is arranged between the ends of the polygonal mirror and the rotating support member.

4. The device as claimed in claim 1, wherein the ends of the polygonal mirror are provided with centering pins which engage round or in the rotating support member and which centre the polygonal mirror relative to the drive means.

5. The device as claimed in claim 1, wherein a protruding gripping component is fixed to the polygonal mirror.

6. The device as claimed in claim 1, wherein the height-width ratio of the polygonal mirror has a value of about 1 or higher.

7. The device as claimed in claim 6, wherein a laser light source adjusting member is fixed to the laser light source, which positions the laser light source in only the horizontal direction.

8. The device as claimed in claim 1, wherein the rotatable polygonal mirror is arranged in the vicinity of a first corner of the housing and the fixedly disposed mirrors are arranged in the vicinity of an opposite corner of the housing.

9. The device as claimed in claim 1, wherein a resilient holder is arranged around at least a part of the housing.

10. The device as claimed in claim 1, wherein the device is to be used alternately in handheld mode and fixed mode, and the housing comprises a bottom side which is substantially flat for placement of the housing itself and a single window for casting a fixed mode scan pattern or a hand mode scan pattern.

11. The device as claimed in claim 1, wherein the device is to be used alternately in handheld mode and fixed mode, further comprising:
   control means for switching the laser light source on and off such that, depending on the switching on and off, the laser light beam selectively falls on at least one of said number of mirrors, thereby generating a fixed mode scan pattern or a hand mode scan pattern, wherein both said fixed mode scan pattern and said hand mode scan pattern are generated by reflection of the laser light on at least one of said number of mirrors.

12. The device as claimed in claim 11, comprising:
position determining means connected to said control means and arranged in the housing for determining a position of the laser light falling onto said mirrors.

13. The device as claimed in claim 12, wherein the position determining means comprises:
sensor means which detects laser light reflected from the polygonal mirror towards at least one of said mirrors; and
rotation speed determining means which determine the rotation speed of the rotatable polygonal mirror.

14. The device as claimed in claim 13, wherein the sensor means is disposed in the vicinity of said at least one mirror, detecting a passage of the laser light and the point in time at which it occurs.

15. The device as claimed in claim 2, wherein the polygonal mirror and the rotating support member are non-integrally affixed to each other.

* * * * *